United States Patent Office 3,114,673
Patented Dec. 17, 1963

3,114,673
NOVEL 2,5-DIMETHYL - 6 - (DIALKYLAMINO-ALKYL) PHENYL METHYLCARBAMATES AND COMPOSITIONS AND METHOD FOR CONTROLLING INSECTS
Alan J. Lemin, Richland, Mich., assignor to The Upjohn Company, Kalamazoo, Mich., a corporation of Delaware
No Drawing. Filed Feb. 8, 1962, Ser. No. 171,830
16 Claims. (Cl. 167—30)

This invention pertains to novel chemical compounds, and to a novel method and novel compositions for controlling pestiferous insects. More particularly, the invention is directed to novel 2,5-dimethyl-6-(dialkylaminoalkyl)phenyl methylcarbamates and acid addition salts thereof, and to a novel method and novel compositions for controlling pestiferous insects utilizing said 2,5-dimethyl - 6 - (dialkylaminoalkyl)-phenyl methylcarbamates.

The novel compounds of the invention are represented by the following structural formula:

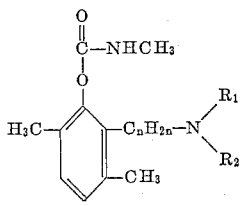

(I)

wherein $R_1$ and $R_2$ are alkyl of from 1 to 4 carbon atoms, inclusive, for example, methyl, ethyl, propyl, butyl, and isomeric forms thereof; and $n$ is an integer from 1 to 3, inclusive.

It has now been found, in accordance with the invention, that the 2,5-dimethyl-6-(dialkylaminoalkyl)phenyl methylcarbamates of Formula I are toxic to insects. The compounds are active in low concentrations against flies (particularly when combined with a methylenedioxyphenyl synergist such as piperonyl butoxide), army worms, bean beetles, aphids, and mites; and they can be used generally in the control of insect pests. As used herein, the term "insect" is used in the same sense as in the Federal Insecticide, Fungicide, and Rodenticide Act of 1947 and refers generally to animals comprising the phylum Arthropoda, illustratively, class Insecta, for example, orders Isoptera, Thysanoptera, Mallophaga, Hemiptera, Anoplura, Homoptera, Coleoptera, Lepidoptera, Orthoptera, Diptera, and Hymenoptera; and class Arachnida, for example, orders Araneae and Acarina.

Compounds of the Formula I, above, are readily prepared by condensing a 2,5-dimethyl-6-(dialkylaminoalkyl)phenol having the following structural formula:

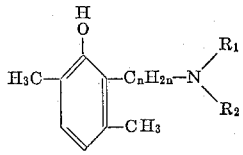

(II)

wherein $R_1$, $R_2$, and $n$ are as defined above with methyl isocyanate. The reactants are preferably mixed in equimolar proportions in the presence of an inert organic solvent, for example, diethyl ether, acetone, diisopropyl ether, dioxane, and the like; but, if desired, an excess of either reactant can be used. A minor amount, e.g., a few drops per 100 ml. of solution, of a catalyst such as triethylamine, pyridine, picoline, lutidine, and the like can be included, if desired, to promote the reaction. The reaction proceeds readily at temperatures between about 15° C. and about 100° C., and satisfactory results are obtained by allowing the reaction mixture to stand overnight at about 25° C. The product is recovered by conventional methods such as filtration or concentration of the reaction mixture followed by filtration, washing, distillation, recrystallization, etc.

The compounds of Formula I can also be prepared by reacting a 2,5-dimethyl - 6 - (dialkylaminoalkyl)phenol (Formula II, above) preferably in the form of an alkali metal salt, e.g., sodium or potassium salt, with phosgene to form the corresponding 2,5-dimethyl-6-(dialkylaminoalkyl)phenyl chloroformate, and then reacting the 2,5-dimethyl - 6 - (dialkylaminoalkyl)phenyl chloroformate with methylamine. More specifically, the 2,5-dimethyl-6-(dialkylaminoalkyl)phenyl chloroformate is prepared by mixing a water solution of 2,5-dimethyl-6-(dialkylaminoalkyl)phenol containing a base, for example, sodium hydroxide or potassium hydroxide, and a solution of phosgene in an inert organic solvent, for example, toluene, benzene, diethyl ether, and the like. This reaction is exothermic and is advantageously carried out at temperatures between about −30° C. and about +30° C. The phosgene:organic solvent solution is added slowly and with mixing in order to prevent localized heating or undesirable temperatures above about 30° C. The 2,5-dimethyl - 6 - (dialkylaminoalkyl)phenyl chloroformate, thus formed, accumulates in the organic phase and the aqueous phase is separated. The chloroformate intermediate can then be isolated and purified by recrystallization or distillation, or it can be used without further purification in the preparation of the methylcarbamates of the invention.

The reaction of methylamine and the 2,5-dimethyl-6-(dialkylaminoalkyl)phenyl chloroformate is carried out in the presence of a solvent, for example, water, diethyl ether, and dioxane. The reaction is advantageously carried out at temperatures in the range of about 10° C. to about 25° C., care being taken to prevent volatilization of the methylamine. Stoichiometrically, the reaction requires one mole of methylamine for each mole of chloroformate. However, the reaction produces one mole of hydrogen chloride, so an excess of methylamine, preferably at least one mole excess, or another suitable acid acceptor, for example, triethylamine, pyridine, picoline, sodium hydroxide, and the like, should be employed. The 2,5-dimethyl-6-(dialkylaminoalkyl)phenyl methylcarbamate product is recovered by conventional methods, for example, filtering off any solids, removing the solvent, washing, and recrystallizing from a suitable solvent.

The 2,5-dimethyl - 6 - (dialkylaminoalkyl)phenols of Formula II are prepared by conventional methods; some of them are available commercially. Illustratively, the 2,5-dimethyl-6-(dialkylaminomethyl)phenols are readily prepared by the Mannich reaction which comprises reacting a dialkylamine of the formula

wherein $R_1$ and $R_2$ are as specified above, with formaldehyde and 2,5-xylenol in accordance with the procedure described in Organic Reactions I, 303–341, 1942.

The 2,5-dimethyl - 6 - (dialkylaminoalkyl)phenols of Formula II wherein the —$C_nH_{2n}$— group is a straight or branch chain alkylene radical having at least two carbon atoms between the valences can be prepared by the method described by Kindler et al., Arch. Pharm. 283, 184–190, 1950 (C.A. 45, 1970h, 1951).

The 2,5-dimethyl - 6 - (dialkylaminoalkyl)phenols of Formula II wherein the —C$_n$H$_{2n}$— group is

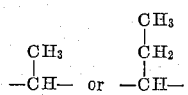

are readily prepared by reacting 3,6-dimethyl-2-methoxyacetophenone or 3,6-dimethyl-2-methoxypropiophenone with the appropriate dialkylamine, e.g., dimethylamine, diethylamine, dipropylamine, and the like, in the presence of formamide and formic acid according to the Leuckart reaction described in Organic Reactions V, 301–330, 1949, to produce the corresponding 2,5-dimethyl-6-(1-dialkylaminoethyl- or -propyl)anisole and demethylating. The 3,6-dimethyl-2-methoxyacetophenone can be prepared by converting 2,5-xylenol to the acetate, rearranging the acetate by heating with aluminum chloride to obtain 3,6-dimethyl-2-hydroxyacetophenone, and methylating the latter with dimethyl sulfate. By starting with the propionate of 2,5-xylenol instead of the acetate, 3,6-dimethyl-2-methoxypropiophenone is obtained.

The acid addition salts of the invention comprise the salts of the compounds having the Formula I, above, with acids. The acid addition salts can be prepared by conventional methods. For example, the compound having the Formula I can be treated with at least a stoichiometric amount of the appropriate acid; and depending upon the nature of the solvent employed, the desired salt will separate spontaneously or can be precipitated by the addition of a solvent in which the salt is insoluble. A pharmacologically acceptable acid addition salt can be prepared using acids such as sulfuric, hydrochloric, hydrobromic, nitric, phosphoric, benzoic, p-toluenesulfonic, salicylic, acetic, propionic, tartaric, citric, succinic acids, and the like. Likewise, the compounds of this invention having Formula I above can be reacted with fluosilicic acid in accordance with U.S. Patents 1,915,334 and 2,075,359 for preparing amine fluosilicate mothproofing agents and in accordance with U.S. Patents 2,425,320 and 2,606,115 in preparing amine thiocyanate-formaldehyde condensation products for use as pickling inhibitors.

EXAMPLE 1.—PREPARATION OF 2,5-DIMETHYL-6-(DIMETHYLAMINOMETHYL)PHENYL METHYLCARBAMATE

To a solution of 17.9 g. (0.10 mole) of 2,5-dimethyl-6-(dimethylaminomethyl)phenol in 100 ml. of anhydrous diethyl ether were added 2 drops of triethylamine and 5.7 g. (0.10 mole) of methyl isocyanate. The reaction mixture was held at about 25° C. for about 16 hrs., and the diethyl ether was removed by distillation. The residue was suspended in 25 ml. of cold diethyl ether and the suspension was filtered. There was thus obtained 14.0 g. of 2,5-dimethyl-6-(dimethylaminomethyl)phenyl methylcarbamate having a melting point of 85° to 86° C.

*Analysis.*—Calc'd for $C_{13}H_{20}N_2O_2$: C, 66.1; H, 8.5; N, 11.9. Found: C, 66.2; H, 8.65; N, 11.9.

EXAMPLE 2.—PREPARATION OF 2,5-DIMETHYL-6-(2-DIETHYLAMINOETHYL)PHENYL METHYLCARBAMATE AND THE HYDROCHLORIDE THEREOF

To a solution of 30.6 g. (0.14 mole) of 2,5-dimethyl-6-(2-diethylaminoethyl)phenol in 200 ml. of anhydrous diethyl ether were added 4 drops of triethylamine and 8.6 g. (0.15 mole) of methyl isocyanate. The reaction mxture was held at about 25° C. for about 16 hrs., and the diethyl ether was removed on a steam bath. The yellow oil thus obtained was mixed with 15 ml. of n-hexane, and the mixture was cooled in an acetone-solid carbon dioxide bath. The resulting white solid was recovered by filtration, washed with n-hexane, and dried at 25° C. under reduced pressure. There was thus obtained 13.7 g. of 2,5-dimethyl-6-(2-diethylaminoethyl)phenyl methylcarbamate having a melting point of 56° to 59° C.

*Analysis.*—Calc'd for $C_{16}H_{26}N_2O_2$: C, 69.0; H, 9.4; N, 10.1. Found: C, 69.1; H, 9.0; N, 10.1.

The hydrochloride was prepared by dissolving 10 g. of 2,5-dimethyl-6-(2 - diethylaminoethyl)phenyl methylcarbamate in 200 ml. of anhydrous diethyl ether and acidifying the solution with anhydrous hydrogen chloride gas. A precipitate formed and the mixture was held at about 25° C. for about 16 hrs. The precipitate was recovered on a filter and dried at about 25° C. under reduced pressure to give 2,5-dimethyl-6-(2-diethylaminoethyl)phenyl methylcarbamate hydrochloride.

EXAMPLE 3.—PREPARATION OF 2,5-DIMETHYL-6 - (DI - n - PROPYLAMINOMETHYL)PHENYL METHYLCARBAMATE

Following the procedure of Example 1, but substituting 2,5-dimethyl-6-(di-n-propylaminomethyl)phenol for 2,5-dimethyl-6-(dimethylaminomethyl)phenol, there was prepared 2,5-dimethyl - 6 - (di-n-propylaminomethyl)-phenyl methylcarbamate.

EXAMPLE 4.—PREPARATION OF 2,5-DIMETHYL-6 - (DI - n - BUTYLAMINOMETHYL)PHENYL METHYLCARBAMATE

Following the procedure of Example 1, but substituting 2,5-dimethyl-6-(di-n-butylaminomethyl)phenol for 2,5-dimethyl-6-(dimethylaminomethyl)phenol, there was prepared 2,5-dimethyl-6-(di-n-butylaminoethyl)phenyl methylcarbamate.

EXAMPLE 5.—PREPARATION OF 2,5-DIMETHYL-6-(1-DIMETHYLAMINOETHYL)PHENYL METHYLCARBAMATE

Following the procedure of Example 1, but substituting 2,5 - dimethyl-6-(1-dimethylaminoethyl)phenol for 2,5-dimethyl-6-(dimethylaminomethyl)phenol, there was prepared 2,5 - dimethyl-6-(1-dimethylaminoethyl)phenyl methylcarbamate.

EXAMPLE 6.—PREPARATION OF 2,5-DIMETHYL-6 - (1 - DIMETHYLAMINOPROPYL)PHENYL METHYLCARBAMATE

Following the procedure of Example 1, but substituting 2,5-dimethyl-6-(1-dimethylaminopropyl)phenol for 2,5-dimethyl-6-(dimethylaminomethyl)phenol, there was prepared 2,5-dimethyl - 6 - (1-dimethylaminopropyl)phenyl methylcarbamate.

The 2,5-dimethyl-6-(dialkylaminoalkyl)phenyl methylcarbamates of this invention are potent insecticides and they can be used in low concentration for controlling insect pests. It is known that some carbamates have insecticidal activity, but only 1-naphthyl-N-methylcarbamate has attained commercial importance. Other carbamates, e.g., the N,N-dimethylcarbamate of 5,5-dimethyldihydroresorcinol, 1-isopropyl-3-methylpyrazolyl-5 dimethylcarbamate, and 2-n-propyl-4-methylpyrimidyl-6 dimethylcarbamate are known to be highly toxic to houseflies and certain other insects, but they are inactive against mites. The 2,5-dimethyl-6-(dialkylaminoalkyl)phenyl methylcarbamates of this invention are active against mites at concentrations as low as 0.001%.

The insecticidally active 2,5-dimethyl-6-(dialkylaminoalkyl)phenyl methylcarbamates of this invention can be used in their pure state for controlling insect pests, but for practical reasons related to mode of application and economy it is preferred that they be formulated as insecticidal compositions. Such compositions comprise 2,5-dimethyl-6-(dialkylaminoalkyl)phenyl methylcarbamate and a diluent carrier, preferably a dispersible insecticide carrier of the kind commonly used in the art, with or without adjuvants. In accordance with the invention, the compositions include solutions, emulsions, suspensions, wettable powders, emulsifiable concentrates, granular formulations, and dusts.

For example, insecticidal compositions useful against insects which infest plants can be formulated as indicated for application to foliage, seeds, or other parts of plants. Compositions suitable for root or bole infusion can be made. Moreover, the active agents of the invention can be used alone in the compositions, or they can be used in combination with other insecticidal, fungicidal, virucidal, or bactericidal agents.

It is usually desirable, particularly in the case of foliar spray formulations, to include adjuvants such as wetting agents, spreading agents, dispersing agents, stickers and adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore being suitable for the compositions of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, e.g., sodium salts. All of these surfactants are capable of reducing the surface tension of water to less than about 40 dynes per centimeter in concentrations of about 1% or less.

The insecticidal dusts of the invention comprise the 2,5-dimethyl - 6 - (dialkylaminoalkyl)phenyl methylcarbamate dispersed in an inert dusting powder as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously, less than 15 microns. The amount of 2,5-dimethyl-6-(dialkylaminoalkyl)phenyl methylcarbamate formulated in a dusting powder composition is advantageously about 2% to about 80%, by weight, preferably about 5% to 25%, by weight. Illustratively, a dusting powder is obtained by mixing approximately equal parts of the active ingredient and pyrophyllite, comminuting either before or after the admixture as desired. A wettable powder suitable for dispersing in an aqueous vehicle is obtained by including a surfactant with a dusting powder. Suitable surfactants include sodium lauryl sulfate, sodium and calcium lignosulfonates, 1-tetradecyl-4-methylpyridinium chloride, Triton X-100 (isooctylphenoxy polyethoxy ethanol), and Pluronic F-68 (ethylene oxide-propylene glycol condensate, nonionic surfactant). If desired the surfactant can be incorporated in the dry mixture either by dry milling or by adding it in solution in a volatile solvent such as ethanol or acetone, mixing to form a paste, drying, and milling.

For convenience in handling, the active compounds of the invention can be prepared with or without adjuvants in the form of concentrated solutions in a solvent, for example, toluene, xylene, acetone, benzene, ethyl acetate, dimethylformamide, dimethylacetamide, dimethyl sulfoxide, acetonitrile, cyclohexanone, or similar solvent. Advantageously, the concentration of active ingredient in the concentrates can range from about 5% to about 50% by weight, preferably from about 10% to about 40%. Such concentrates can be dispersed in a suitable volume of an aqueous medium in the presence of a surfactant such as those disclosed above to give a mixture of any desired concentration. The surfactant can be included in the concentrated solution of the active ingredient to give an emulsifiable concentrate, or it can be added separately when the aqueous dispersion is being prepared. For the most part, mixtures containing very low concentrations of the active ingredient are effective. Illustratively, the concentration of the 2,5-dimethyl-6-(dialkylaminoalkyl)phenyl methylcarbamate can range from about 25 to about 5000 p.p.m., depending upon the amount of active material applied per acre. For example, excellent control of spider mites (*Tetranychus atlanticus*) on infected cotton plants has been obtained using concentrations of active ingredient ranging from about 25 to 2000 p.p.m. at rates ranging from 0.1 to 1.5 lbs. per acre without damage to the plants. For example, an emulsifiable concentrate comprising 5% (by weight) of the compound can be admixed with an aqueous medium in the proportions of one teaspoonful (about 5 cc.) of concentrate with one gallon of medium to give a mixture containing 60 to 75 parts of active ingredient per million parts of water. Similarly, one pint of 5% concentrate mixed with 100 gals. of water provides about 60 p.p.m. of active ingredient. In the same manner, more concentrated solutions of active ingredient in a solvent can be incorporated with an appropriate quantity of an aqueous medium or petroleum base insecticide carrier, e.g. summer oil, kerosene, and like vehicles, to give a dispersible mixture of desired concentration.

A suitable wettable powder formulation is obtained by blending and milling 327 lbs. of Georgia clay, 4.5 lbs. of Triton X-100 as a wetting agent, 9 lbs. of a polymerized sodium salt of a substituted benzoid long-chain sulfonic acid (Daxad 27) as a dispersing agent, and 113 lbs. of the active ingredient. The resulting formulation has the following percentage composition (parts herein are by weight unless otherwise specified):

|  | Percent |
|---|---|
| Active ingredient | 25 |
| Triton X-100 | 1 |
| Daxad 27 | 2 |
| Georgia clay | 72 |

This formulation, when dispersed in water at one pound per 100 gals., gives a spray formulation containing about 0.03% (300 p.p.m.) active ingredient.

A suitable emulsifiable concentrate is obtained by admixing the following materials:

|  | Parts |
|---|---|
| Active ingredient | 15 |
| Xylene | 81.5 |
| Dodecylbenzene sodium monosulfonate | 1.75 |
| Condensation product of one mole of octylphenol and about 12 moles of ethylene oxide | 1.75 |

The mixture of dodecylbenzene sodium monosulfonate and condensation product is added to the xylene, and the active ingredient is then added. This formulation, when dispersed in water at one pint per 100 gals., gives a spray formulation containing about 0.02% (200 p.p.m.) active ingredient.

The active compounds of the invention can also be formulated in relatively dilute proportions in a dispersible insecticide carrier for household applications. Thus, the active compounds can be formulated in dusts having from about 0.1% to 5.0% active ingredient with a dusting powder as hereinbefore described, and in solutions containing from about 0.01% to about 5.0% active ingredient with deodorized kerosene for aerosol applications.

It will of course be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews, and so forth.

Representative compounds of this invention have been tested at various concentrations against adult spider mites (*Tetranychus atlanticus*) and adult pea aphids. The compounds were formulated in a concentrate solution consisting of 1 g. of compound, 5 ml. of benzene, 5 ml. of acetone, and 5 ml. of Triton X–100. One and one-half ml. of the concentrate dispersed in 200 ml. water gave an emulsion containing 0.05% w./v. of the compound. Emulsions containing 0.01%, 0.005% and 0.001% active ingredient were similarly prepared.

Activity against the spider mite was evaluated by dipping mite-infested lima bean plants (50–100 adult mites per plant) in the emulsion prepared as above; adult mortality was determined after 2 days. Activity against pea aphids was evaluated by spraying adult pea aphids with the test formulation and transferring them to sprayed pea plants; adult mortality was determined after 2 days. Table I shows percentage kill of the test organisms caused by varying concentrations of representative compounds of the invention.

*Table I*

| Compound | Spider mites | | | | Pea aphids | | | |
|---|---|---|---|---|---|---|---|---|
| | Concentration (percent by weight) | | | | Concentration (percent by weight) | | | |
| | .05 | .01 | .005 | .001 | .05 | .01 | .005 | .001 |
| 2,5-dimethyl-6-(dimethyl-aminomethyl)-phenyl methylcarbamate | 100 | 100 | 100 | 87 | 100 | 100 | 100 | 10 |
| 2,5-dimethyl-6-(2-diethyl-aminoethyl)-phenyl methylcarbamate | 100 | (¹) | (¹) | (¹) | 100 | (¹) | (¹) | (¹) |

¹ Not tested at these concentrations.

From these data it is readily apparent that the compounds of the invention possess excellent activity against the test organisms, and that they can be used in the control of insect pests.

Further in accordance with this invention, it has been found that the insecticidal activity of the 2,5-dimethyl-6-(dialkylaminoalkyl)phenyl methylcarbamates of the invention is significantly enhanced when formulated with methylenedioxyphenyl synergists, for example, piperonyl butoxide (3,4-methylenedioxy-6-propylbenzyl n-butyl diethylene glycol ether), sesamex or Sesoxane [2-(3,4-methylenedioxyphenoxy) - 3,6,9 - trioxaundecane], sulfoxide (n-octylsulfoxide of isosafrole), and n-propyl isome (di-n-propyl-6,7-methylenedioxy - 3 - methyl-1,2,3,4-tetrahydronaphthalene-1,2-dicarboxylate); sesamine oil derivatives; and octachlorodipropyl ether. See Kenaga, Bull. Entomol. Soc. Amer. 6, 55, 1960. Illustratively, the activity of a 0.05% solution of 2,5-dimethyl-6-(dimethylaminomethyl)phenyl methylcarbamate against houseflies was increased 100% by including 0.4% piperonyl butoxide. The piperonyl butoxide alone showed no activity under the same conditions. The synergistic combinations can be formulated as aqueous emulsions, as dry or wettable powders, as solutions to be applied as aerosols, or in other vehicles. The relative proportions of the synergistic components can vary widely depending upon the insect pest to be controlled; however, from 0.5 to 20 parts of a synergistic compound as noted above to 1 part of carbamate is generally satisfactory. The compositions can contain from about 0.05% to 75% of the synergistic components in the emulsions, dry or wettable powders, solutions to be applied as aerosols, or other vehicles.

A suitable aerosol formulation is obtained by admixing the following materials:

| | |
|---|---|
| Active ingredient | mg__ 20 |
| Piperonyl butoxide | mg__ 100 |
| Acetone | ml__ 20 |
| Deodorized kerosene | ml__ 80 |

The active ingredient and piperonyl butoxide are dissolved in the acetone; the resulting solution is then thoroughly mixed with the deodorized kerosene. This mixture is placed in an aerosol bomb pressurized with nitrogen, to provide a spray containing about 250 p.p.m. of active ingredient after evaporation of the acetone. This formulation is very convenient for home use, for example, in destroying houseflies, mosquitoes, etc.

The novel compounds described herein are versatile insecticidal agents which can be employed for many purposes, e.g., in agriculture, in industry, in the home, etc. In addition, they are useful in pharmaceutical art as drugs, intermediates, and chemotherapeutics. The compounds are local anesthetics and exhibit anticholinesterase activity. They are useful in the treatment of birds, mammals, and humans.

I claim:

1. Compound selected from the group consisting of (1) 2,5-dimethyl-6-(dialkylaminoalkyl)phenyl methylcarbamates of the formula:

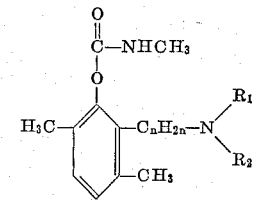

wherein $R_1$ and $R_2$ are alkyl of from 1 to 4 carbon atoms, inclusive, and $n$ is an integer from 1 to 3, inclusive; and (2) acid addition salts thereof.

2. The compound 2,5-dimethyl-6-(dialkylaminomethyl)phenyl methylcarbamate wherein "alkyl" is of from 1 to 4 carbon atoms, inclusive.

3. The compound 2,5-dimethyl-6-(dimethylaminomethyl)phenyl methylcarbamate.

4. The compound 2,5-dimethyl-6-(2-dialkylaminoethyl)phenyl methylcarbamate wherein "alkyl" is of from 1 to 4 carbon atoms, inclusive.

5. The compound 2,5-dimethyl-6-(2-diethylaminoethyl)phenyl methylcarbamate.

6. Composition of matter in readily dispersible form and useful for controlling insects comprising a carrier, and, as the essential active ingredient, the compound selected from the group consisting of (1) 2,5-dimethyl-6-(dialkylaminoalkyl)phenyl methylcarbamate of the formula:

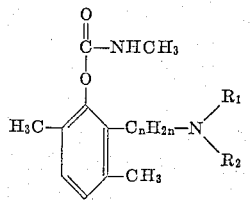

wherein $R_1$ and $R_2$ are alkyl of from 1 to 4 carbon atoms, inclusive, and $n$ is an integer from 1 to 3, inclusive; and (2) acid addition salts thereof.

7. Composition of matter useful for controlling insects comprising a liquid carrier and, as the essential active ingredient, the compound selected from the group consisting of (1) 2,5-dimethyl-6-(dialkylaminoalkyl)phenyl methylcarbamate of the following formula:

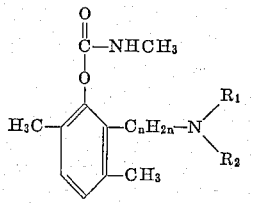

wherein $R_1$ and $R_2$ are alkyl of from 1 to 4 carbon atoms, inclusive, and $n$ is an integer from 1 to 3, inclusive; and (2) acid addition salts thereof.

8. Composition of matter useful for controlling insects comprising a petroleum base carrier and, as the essential active ingredient, the compound selected from the group consisting of (1) 2,5-dimethyl - 6 - (dialkylaminoalkyl)-phenyl methylcarbamate of the formula:

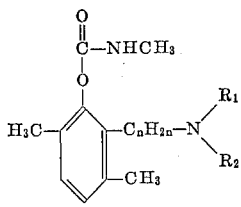

wherein $R_1$ and $R_2$ are alkyl of from 1 to 4 carbon atoms, inclusive, and $n$ is an integer from 1 to 3, inclusive; and (2) acid addition salts thereof.

9. Composition of matter for controlling insects comprising deodorized kerosene and, as the essential active ingredient, the compound selected from the group consisting of (1) 2,5-dimethyl-6-(dialkylaminoalkyl) phenyl methylcarbamate of the formula:

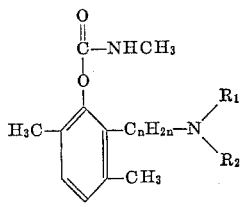

wherein $R_1$ and $R_2$ are alkyl of from 1 to 4 carbon atoms, inclusive, and $n$ is an integer from 1 to 3, inclusive; and (2) acid addition salts thereof.

10. Composition of matter in readily dispersible form and useful for controlling insects comprising a carrier, a surfactant, and, as the essential active ingredient, the compound selected from the group consisting of (1) 2,5-dimethyl-6-(dialkylaminoalkyl)phenyl methylcarbamate of the formula:

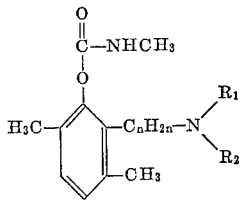

wherein $R_1$ and $R_2$ are alkyl of from 1 to 4 carbon atoms, inclusive, and $n$ is an integer from 1 to 3, inclusive; and (2) acid addition salts thereof.

11. Composition of matter in readily dispersible form and useful for controlling insects comprising a carrier, a surfactant, and 2,5-dimethyl-6-(dialkylaminomethyl)-phenyl methylcarbamate according to claim 10.

12. Composition of matter in readily dispersible form and useful for controlling insects comprising a carrier, a surfactant, and 2,5-dimethyl-6-(2-dialkylaminoethyl)-phenyl methylcarbamate according to claim 10.

13. The method for controlling insects which comprises contacting said insects with an insecticidally toxic amount of 2,5-dimethyl-6-(dialkylaminoalkyl)phenyl methylcarbamate of the formula:

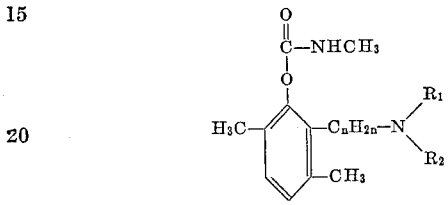

wherein $R_1$ and $R_2$ are alkyl of from 1 to 4 carbon atoms, inclusive, and $n$ is an integer from 1 to 3, inclusive; and (2) acid addition salts thereof.

14. The method for controlling insects which comprises contacting said insects with an insecticidally toxic amount of 2,5-dimethyl-6-(dimethylaminomethyl)phenyl methylcarbamate.

15. The method for controlling insects which comprises contacting said insects with an insecticidally toxic amount of 2,5-dimethyl-6-(2-diethylaminoethyl)phenyl methylcarbamate.

16. A concentrate composition of matter comprising, as the essential active ingredient, from about 5% to about 50% of 2,5-dimethyl-6-(dimethylaminomethyl)phenyl methylcarbamate, a solvent therefor, and a surfactant.

References Cited in the file of this patent
UNITED STATES PATENTS
2,843,519   Fitch _____ July 15, 1958

OTHER REFERENCES
Kolbezen et al.: Journal of Agricultural and Food Chemistry, vol. 2, pages 864–870 (1954).